(12) United States Patent
Pendray et al.

(10) Patent No.: US 12,343,718 B2
(45) Date of Patent: Jul. 1, 2025

(54) BED LEVEL SENSOR FOR SOLID BEDS WITH LEVELING ACTUATORS

(71) Applicant: CUMMINS INC., Columbus, IN (US)

(72) Inventors: John Robert Pendray, Blaine, MN (US); Gregory J. Mitchum, Franklin, IN (US); Kevin James Keene, Minneapolis, MN (US)

(73) Assignee: Cummins Inc., Columbus, IN (US)

( * ) Notice: Subject to any disclaimer, the term of this patent is extended or adjusted under 35 U.S.C. 154(b) by 121 days.

(21) Appl. No.: 17/948,507

(22) Filed: Sep. 20, 2022

(65) Prior Publication Data

US 2023/0103111 A1   Mar. 30, 2023

Related U.S. Application Data

(60) Provisional application No. 63/249,799, filed on Sep. 29, 2021.

(51) Int. Cl.
| | |
|---|---|
| *C10B 57/00* | (2006.01) |
| *B01J 6/00* | (2006.01) |
| *C10B 41/00* | (2006.01) |
| *C10B 41/04* | (2006.01) |
| *C10B 47/04* | (2006.01) |
| *C10B 53/02* | (2006.01) |
| *G01F 23/32* | (2006.01) |

(Continued)

(52) U.S. Cl.
CPC ............. *B01J 6/008* (2013.01); *C10B 41/00* (2013.01); *C10B 41/04* (2013.01); *C10B 47/04* (2013.01); *C10B 53/02* (2013.01); *C10B 57/00* (2013.01); *G01F 23/32* (2013.01); *G01F 23/36* (2013.01); *G01F 23/56* (2013.01); *B01J 2208/0061* (2013.01)

(58) Field of Classification Search
CPC ................... G01F 23/30–76; B01J 2208/0061
See application file for complete search history.

(56) References Cited

U.S. PATENT DOCUMENTS

| 1,941,130 A | * | 12/1933 | Weeks | ................... C10B 33/00 |
| | | | | 202/262 |
| 3,110,420 A | | 11/1963 | Brewer | |

(Continued)

FOREIGN PATENT DOCUMENTS

| WO | WO-2018/213474 | | 11/2018 |
| WO | WO-2019/132466 A1 | | 7/2019 |

OTHER PUBLICATIONS

EP Search Report for EP Application No. 22198287.9, dated Feb. 23, 2023.

*Primary Examiner* — Jonathan Luke Pilcher
(74) *Attorney, Agent, or Firm* — Foley & Lardner LLP

(57) ABSTRACT

A biochar production system includes a reactor body, a central rod disposed within the reactor body, a leveling arm extending from the central rod and configured to rotate about the central rod, and a bed level sensor system. The bed level sensor system includes a float configured to move from a resting position on a biomass in the reactor to an ending position upon contact with the leveling arm, and a level sensor coupled to the float via a connector. The level sensor is configured to correspondingly move with the float. A controller is configured to detect bed levels of the biomass within the reactor body, and determine a plurality of sample readings based on the detected bed levels.

14 Claims, 7 Drawing Sheets

(51) Int. Cl.
    *G01F 23/36*     (2006.01)
    *G01F 23/56*     (2006.01)

(56)     References Cited

U.S. PATENT DOCUMENTS

| | | | |
|---|---|---|---|
| 3,253,745 A | | 5/1966 | Skelton |
| 4,225,392 A | * | 9/1980 | Taylor .................. C10B 1/04 |
| | | | 48/85 |
| 4,599,092 A | | 7/1986 | Eichelsbacher et al. |
| 4,659,340 A | | 4/1987 | Weaver |
| 4,968,325 A | * | 11/1990 | Black .................... C10J 3/56 |
| | | | 48/77 |
| 5,226,927 A | | 7/1993 | Rundstrom |
| 8,317,886 B2 | * | 11/2012 | Graham ............... C10J 3/723 |
| | | | 48/74 |
| 9,567,539 B2 | | 2/2017 | Appel et al. |
| 2004/0007061 A1 | * | 1/2004 | Forgue ............. G01F 23/2968 |
| | | | 73/290 V |
| 2012/0017510 A1 | * | 1/2012 | Leveson ................ C10J 3/26 |
| | | | 126/152 B |
| 2012/0303321 A1 | * | 11/2012 | Vass .................... G05B 9/02 |
| | | | 702/179 |
| 2016/0319198 A1 | * | 11/2016 | Quanci ............... C10B 15/02 |

\* cited by examiner

BED LEVEL SENSOR FOR SOLID BEDS WITH LEVELING ACTUATORS

CROSS-REFERENCE TO RELATED PATENT APPLICATION

This application claims the benefit and priority of U.S. Provisional Patent Application 63/249,799, filed on Sep. 29, 2021 to Pendray et al., titled "BED LEVEL SENSOR FOR BEDS WITH LEVELING ACTUATOR" and the contents of which are incorporated herein by reference in their entirety.

TECHNICAL FIELD

The present disclosure relates to the operation of a bed level sensor of biomass in an autothermal pyrolyzer system.

BACKGROUND

Biochar is a substance that is produced by heating organic material from agricultural and forestry wastes (also called biomass) in a controlled, oxygen deficient process called pyrolysis, Biochar can be used, for example, as fuel, as a soil additive, for filtration purposes, and to store atmospheric carbon. During pyrolysis, the biomass is heated in a container with very little oxygen. As the biomass is heated, it releases pyrolytic gases and is eventually converted into biochar.

To produce biochar in a biochar production system (e.g., an autothermal pyrolyzer, gasifier, etc.), biomass is introduced into a reactor top and moves downward through the reactor where it is heated to the point where the biomass is converted to biochar (i.e., to a pyrolysis temperature). The reaction also causes the biomass to release gases as it is converted to biochar. The gases exit the top of the biochar production system and can be used as fuel. The biochar exits the bottom of the biochar production system and can be used as fuel, as a soil additive, or for filtration purposes. The biochar can also be used to store atmospheric carbon.

The gases released due to pyrolysis are often dewy and opaque, and it is difficult to use measuring techniques to determine a bed level, i.e., the level of biomass in the biochar production system. Without such a diagnostic, the system can run with too low or too high of a biomass level. For instance, when the reactor is too low, the gases coming out of the updraft reactor are excessively hot, leading to potential equipment failure. When biomass levels are too high, agitator jamming or excessive pressure loss across the gasifier may take place. Thus, an arm leveler is provided to detect the biomass level.

SUMMARY

One embodiment relates to a biochar production system. The biochar production system includes a reactor body, a leveling arm extending configured to move generally along a leveling place in the reactor body, and a bed level sensor system. The bed level sensor system includes a float configured to move from a resting position on biomass in the reactor to an ending position upon contact with the leveling arm, and a level sensor coupled to the float via a connector. The level sensor is configured to correspondingly move with the float. A controller is configured to detect bed levels of the biomass within the reactor body, and determine a plurality of sample readings based on the detected bed levels.

Another embodiment provides for a method for selectively controlling a biochar production system. The method includes receiving an operating parameter value by a controller and the controller determines if the operating parameter value is greater than or meets a predetermined set point. The set point is based on a bin volume of a reactor body. The method further includes activating at least one of an extractor to direct more biochar out of the reactor body and activating a conveyer to direct less biomass into the reactor if the operating parameter value is greater than or meets the predetermined set point. The method also includes activating at least one of the extractor to direct less biochar out of the reactor body and activating the conveyer to direct more biomass into the reactor if the operating parameter value is less than the predetermined set point.

Still another embodiment provides for a controller for a biochar production system. The controller is communicatively coupled to a bed level sensor that determines a bed level inside of a reactor body. The output of the bed level sensor is received by the controller. The controller is configured to determine a set point that is indicative of a desired bed level and determine if the output from the bed level sensor is greater than or equal to the set point. The controller is further configured to activate at least one of an extractor to direct more biochar out of the reactor body and activate a conveyor to direct less biomass into the reactor if the output is greater than or equal to the set point. The controller is configured to, if the output is not greater than or equal to the set point, activate at least one of the extractor to direct less biochar out of the reactor body and the conveyor to direct more biomass into the reactor.

DETAILED DESCRIPTION

Following below are more detailed descriptions of methods, apparatuses, and systems for a bed level sensor system. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

As disclosed herein, a sensor is provided on the arm leveler to sense the bed level upon each sweeping pass. As such, a bed level detection solution is created in conjunction with the sweeping arm already present to reset the level. This can further improve uniformity of the gas flow through the bed.

As is described further herein, the biomass level is sensed by a linear or potentially rotary position sensor that is lifted above the bed level periodically to ensure position at the top of the bed. The dry solids bed level sensor is lifted periodically by a bed leveling arm, where the linear position sensor is coupled to the bed leveling arm. In contrast, various alternative conventional bed level sensors for dry beds tend to be sensitive to the condensing environments that are present at the top of the reactor. For example, ultrasonic sensors are sensitive to condensation on the sensing component. Further, rotary motion sensors in contact with the biomass in various conventional systems can stick if they are subjected to condensing tars, and also don't work well with a bed leveling actuator. As such, the bed level sensor described herein allows for better bed level control for the biochar reactor with a low cost, durable, reliable method of bed level sensing.

While embodiments described herein provide a system that can reliably sense bed level while providing variable control feedback, it should be understood that the description and Figures herein are not meant to be limiting. The systems described herein are also applicable to accomplish other effects.

Figure 1:
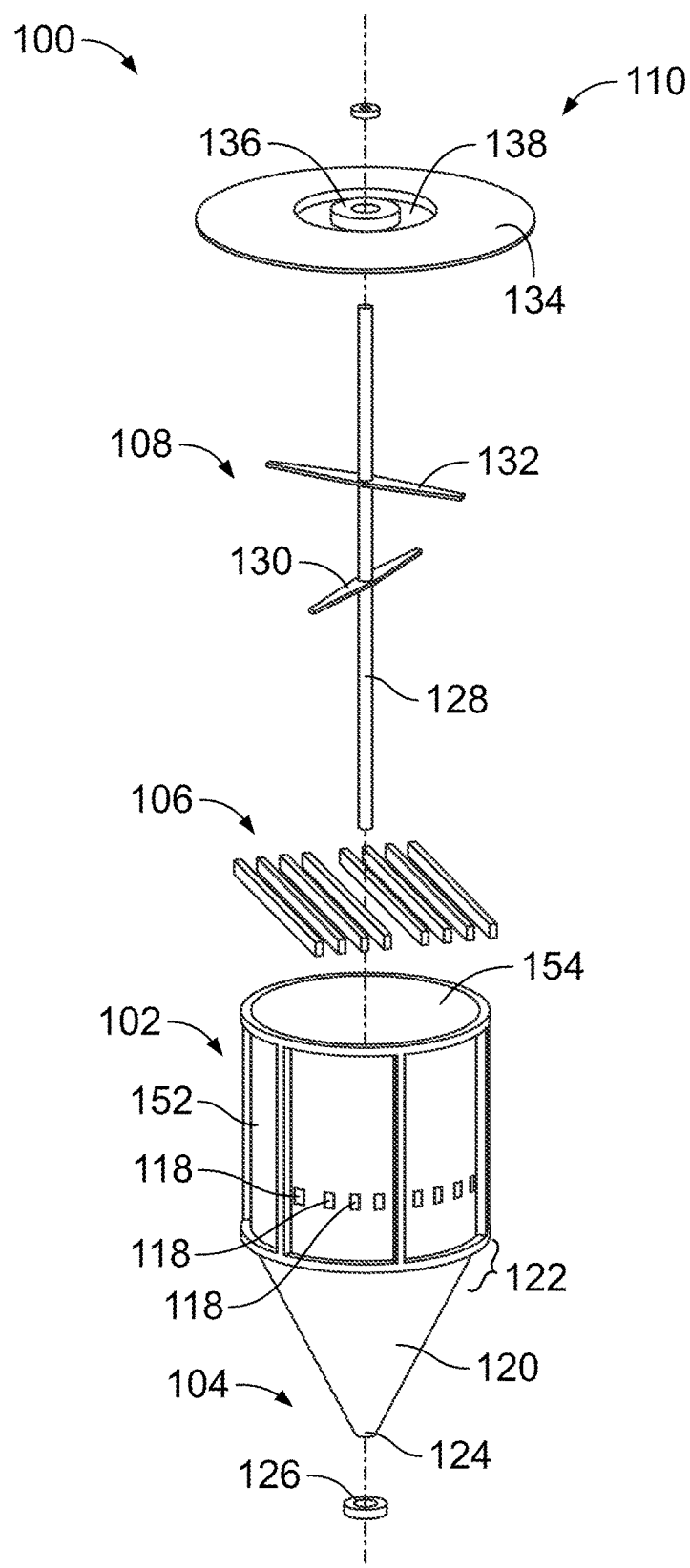
FIG. 1 is an illustration of an exploded view of a biochar production system, according to an example embodiment.

Referring now to FIG. 1, an illustration of an exploded view of a biochar production system 100 is shown, according to an example embodiment. The biochar production system 100 includes a reactor body 102, an extraction body 104, a conduit manifold 106, an agitator 108, and a top portion 110.

The reactor body 102 is generally cylindrical with a substantially circular cross-sectional shape, and includes an outer wall 152 and an inner wall 154. A plurality of apertures 118 extend entirely through the outer wall 152 and the inner wall 154. For each aperture 118, there is a corresponding aperture 118 positioned substantially across from the respective aperture 118 such that a component passing straight through the aperture 118 will also pass through the corresponding aperture 118.

The extraction body 104 is coupled with the reactor body 102 at the first end of the reactor body 102 and is shown to include an extraction cone 120, an outlet 124, and an outlet cap 126. The extraction cone 120 comprises a generally hollow cone shape that is configured to direct biochar away from the reactor body 102 and out of the biochar production system 100 through the outlet 124. The extraction body 104 defines a quench zone 122 configured to introduce a coolant (e.g., water) to the biochar to cool the biochar to a temperature below approximately one hundred degrees Celsius such that the biochar can be handled by an operator after the biochar exits the biochar production system 100.

In some embodiments, the extraction body 104 includes a metering device (not shown) to direct biochar out of the outlet 124. For example, the metering device may include a rotatable augur that directs biochar out of the outlet 124 as it rotates. The metering device may also include a conveyer system to direct biochar out of the outlet 124.

The conduit manifold 106 includes a plurality of conduits configured to interface with the apertures 118 of the reactor body 102 such that the reactor body 102 supports the plurality of conduits. The conduit manifold 106 is configured to introduce air into the reactor body 102 via the plurality of conduits.

The top portion 110 is coupled to the second end of the reactor body 102 and is configured to direct gases away from the reactor body 102. The top portion 110 is shown to include a cover 134 and a bearing 136. The cover 134 comprises a generally circular shape that substantially matches the shape of the second end of the reactor body 102. The bearing 136 is configured to interface with the agitator 108 to facilitate rotation of the agitator 108. In some embodiments, the cover 134 and the bearing 136 define a space therebetween through which gases from the biochar production process are directed. A pipe or other similar device (e.g., channel, tube, duct, etc.) may be coupled with the cover and extend from the space to direct the gases to another location for collection.

The agitator 108 is coupled to the bearing 136 and is configured to disrupt the biomass in the reactor body 102. As shown, the agitator 108 includes a rod 128, a first protrusion 130, and a second protrusion 132. The agitator 108 may be coupled to a motor that causes the rod 128 to rotate such that the first protrusion 130 and the second protrusion 132 contact the biomass as the rod 128 rotates to disrupt the biomass located in the reactor body 102.

Figure 2:
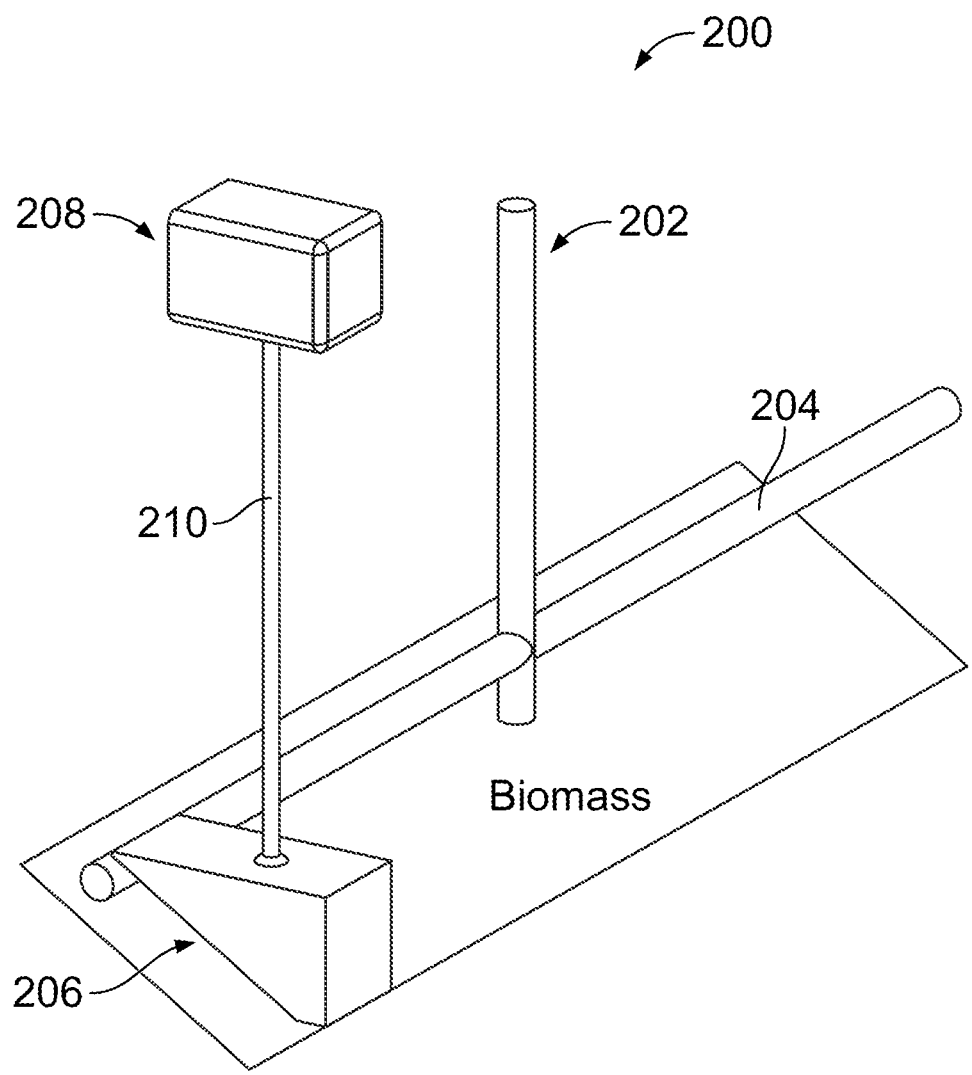
FIG. 2 is an illustration of a bed level sensor system for use in a biochar production system, according to a particular embodiment.

Referring now to FIG. 2, an illustration of a bed level sensor system 200 for use in a biochar production system is shown, according to a particular embodiment. The bed level sensor system 200 is configured to be used in the reactor body 102 of the biochar production system 100, for instance.

The bed level sensor system 200 includes a central rod 202 (e.g., the rod 128 of FIG. 1). The central rod 202 may be disposed in a center of the reactor body 102. As shown in FIG. 1, the reactor body 102 is generally cylindrical with a substantially circular cross-sectional shape such that the central rod 202 runs longitudinally through the center of the reactor body 102. The bed level sensor system 200 further includes a leveling arm 204. The leveling arm 204 extends radially from the central rod 202. The leveling arm 204 may extend from opposite sides of the central rod 202 such that the central rod 202 and the leveling arm 204 form a "T" configuration or a "+" configuration.

The central rod 202 may be coupled to a bearing (e.g., the bearing 136) and a motor (not shown). The motor is configured to cause the central rod 202 to rotate such that the leveling arm 204 rotates about a central axis of the reactor body 102. In turn, the leveling arm 204 is configured to disrupt the biomass in the reactor. In alternative arrangements, however, a central rod may not be used. By way of example, the leveling arm 204 may use an end pivot or a linear motion chain-based device for rotation about the central axis. In still other embodiments, e.g., where the reactor body 102 does not possess a cylindrical shape, the leveling arm 204 may not rotate about the central axis. For example, the leveling arm 204 may move generally along a leveling place in the reactor body 102, e.g., via a reciprocating motion.

The bed level sensor system 200 includes a float 206. The float 206 is configured to rise as the leveling arm 204 rotates and hits the float 206. After the leveling arm 204 passes, the float 206 is configured to fall and rest back on top of the biomass. The bed level sensor system 200 includes a level sensor 208. The level sensor 208 is coupled to the float 206 via a connector 210. The connector 210 may be a rigid rod such that any movement of the float 206 translates to the level sensor 208. For instance, when the float 206 rises as the leveling arm 204 rotates and hits the float 206, the level sensor 208 correspondingly rises. After the leveling arm 204 passes and the float 206 falls, the level sensor 208 correspondingly falls.

The level sensor 208 includes a linear position sensor, e.g. a variable resistance sensor similar to those present in fuel tank level sensors. By periodically lifting the bottom of the level sensor 208 via lifting the float 206 above the bed (e.g. 1-20 times per minute), the bed level sensor system 200 ensures that the level sensor 208 remains on top of the solids bed and does not move down into the bed. Retaining the level sensor 208 above the solids bed is accomplished as the solids bed is "raked" by the leveling arm 204 (e.g., a leveling device) that passes beneath the level sensor 208 and the float 206 of the biochar gasifier reactor. As will be described further herein, as the level sensor 208 settles, the bed level is detected by the level sensor 208.

Figure 4:
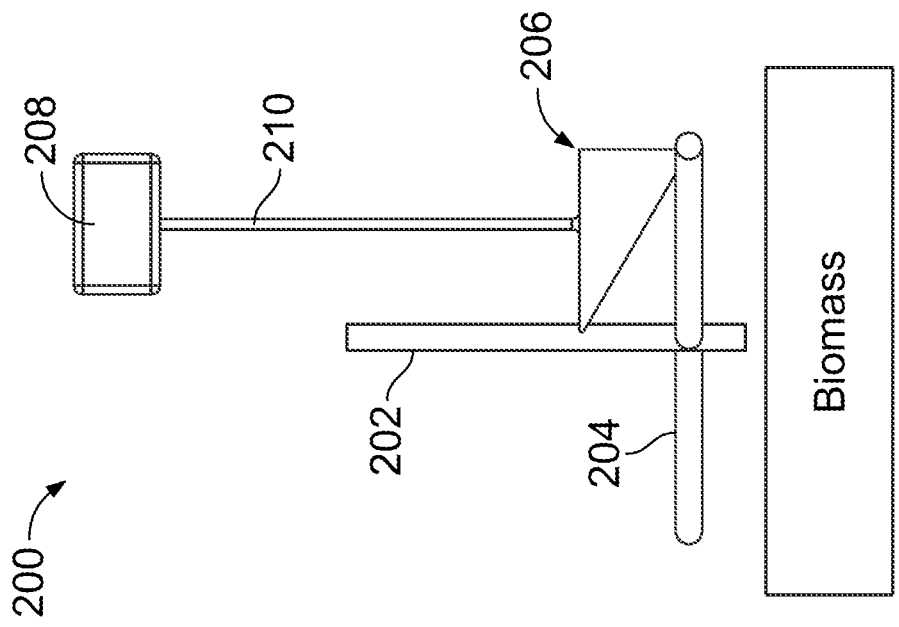
FIGS. 3-4 are illustrations of a linear operation of the bed level sensor system of FIG. 1.
Figure 3:
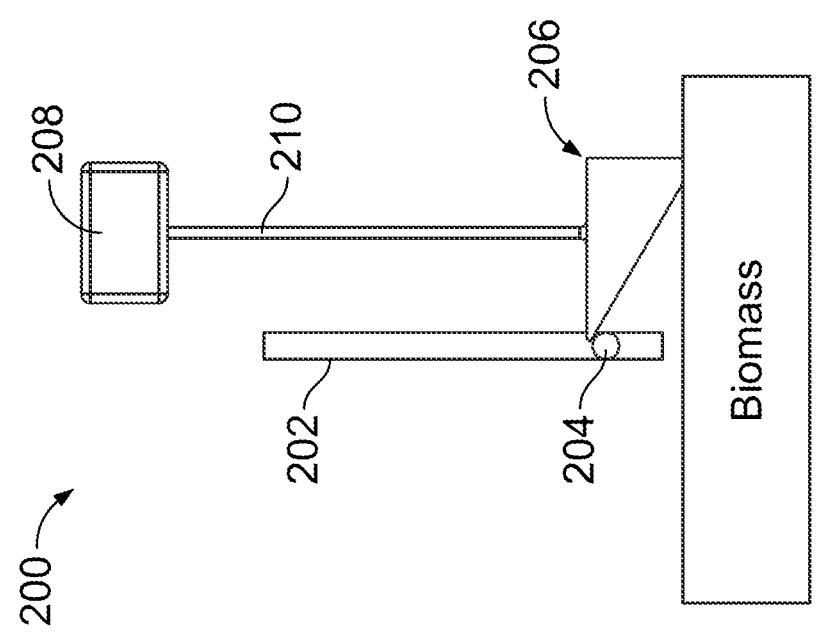
Figure 5:
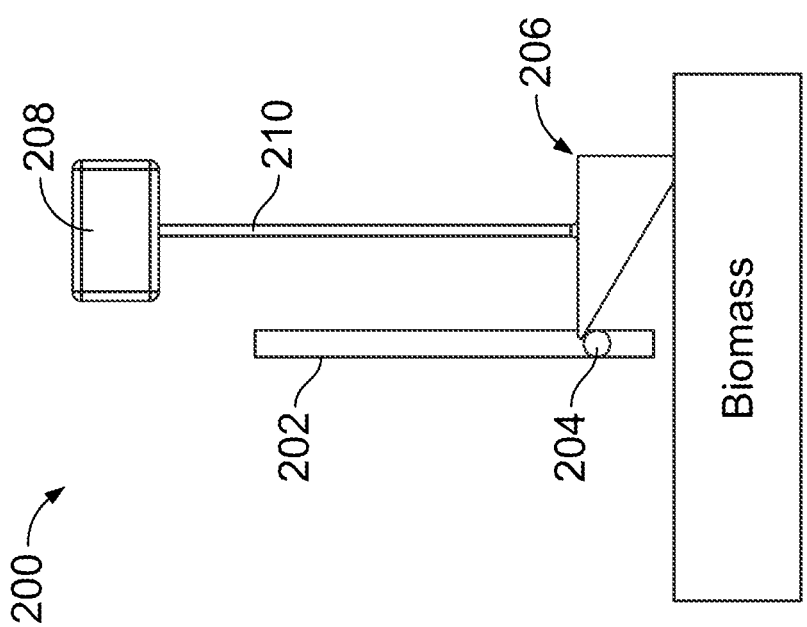
FIGS. 5-6 are illustrations of a rotational operation of the bed level sensor system of FIG. 1.
Figure 6:
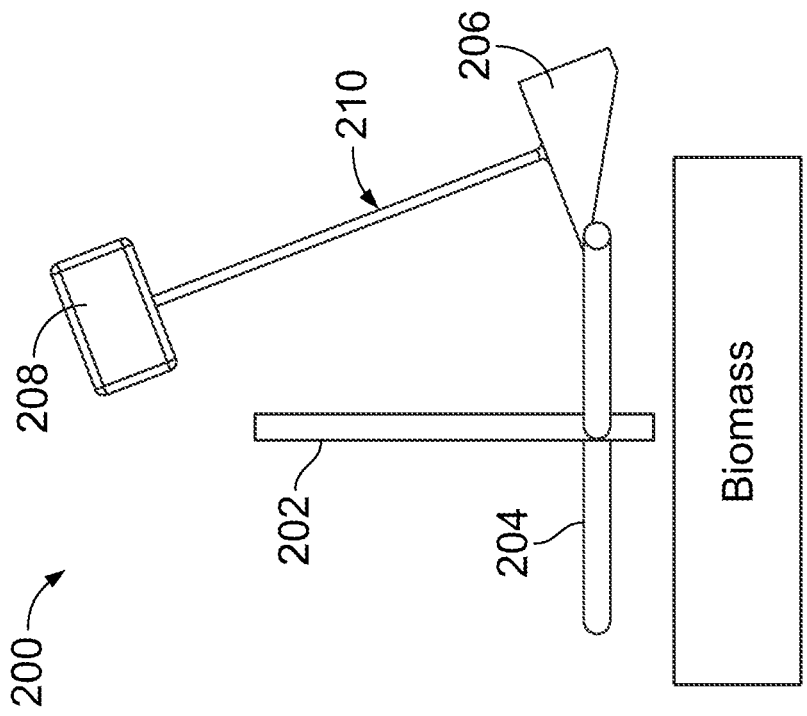

Referring now to FIGS. 3-4 and 5-6, illustrations showing a linear operation of the bed level sensor system of FIG. 1 and a rotational operation of the bed level sensor system of FIG. 2 are shown, respectively. In a default position shown in FIGS. 3 and 5, the float 206 is normally rested on top of the biomass due to gravity. The leveling arm 204 is configured to continuously rotate (e.g. counter-clockwise). For instance, an end of the leveling arm 204 is shown in FIGS. 3 and 5 aligned with the central rod 202 as the leveling arm 204 is in a first position, at the beginning of a rotation, immediately before contacting the float 206. As such, as the leveling arm 204 rotates counterclockwise, contact between the leveling arm 204 and the float 206 occurs due to rotation of the leveling arm 204. Displacement of the float 206 and the level sensor 208 may occur either rotationally or linearly. For instance, as shown in FIG. 4, the float 206 is at a higher position due to the rotation of the leveling arm 204. As shown in FIG. 6, the connector 210 may rotate due to the contact between the float 206 and the leveling arm 204. The rotational motion or the linear/vertical motion of the float 206 prevents the bed level sensor system 200 from being buried by as new biomass is added.

Once the leveling arm 204 passes, the float 206 falls to rest back on the top of the biomass and the level sensor 208 provides a measurement of the biomass level, detected from the change between a starting position (e.g., a resting position before the leveling arm 204 passes) and an ending position (e.g., after the leveling arm 204 passes). In various embodiments, mechanical travel limits may be set for the float 206 and the level sensor 208 to prevent a situation where the biomass would bind with the leveling arm 204.

The biochar production system 100 also includes a controller (not shown). The controller is communicatively coupled with the biochar production system 100 to control operation of the biochar production system 100. The controller determines, based on various characteristics (temperature in various locations, biomass temperature, biochar temperature, etc.), the rate at which biomass is introduced to the biochar production system 100 and the rate at which biochar is directed away from the biochar production system 100. Additionally, the controller is configured to control operation of the bed level sensor system 200. For example, the controller may determine the solids bed level and perform various diagnostic checks. In various embodiments, the controller may have provisions to ignore/omit data when the level sensor 208 is lifted, e.g. a band pass filter or ignoring times known to be associated with sensor lifting.

Figure 7:
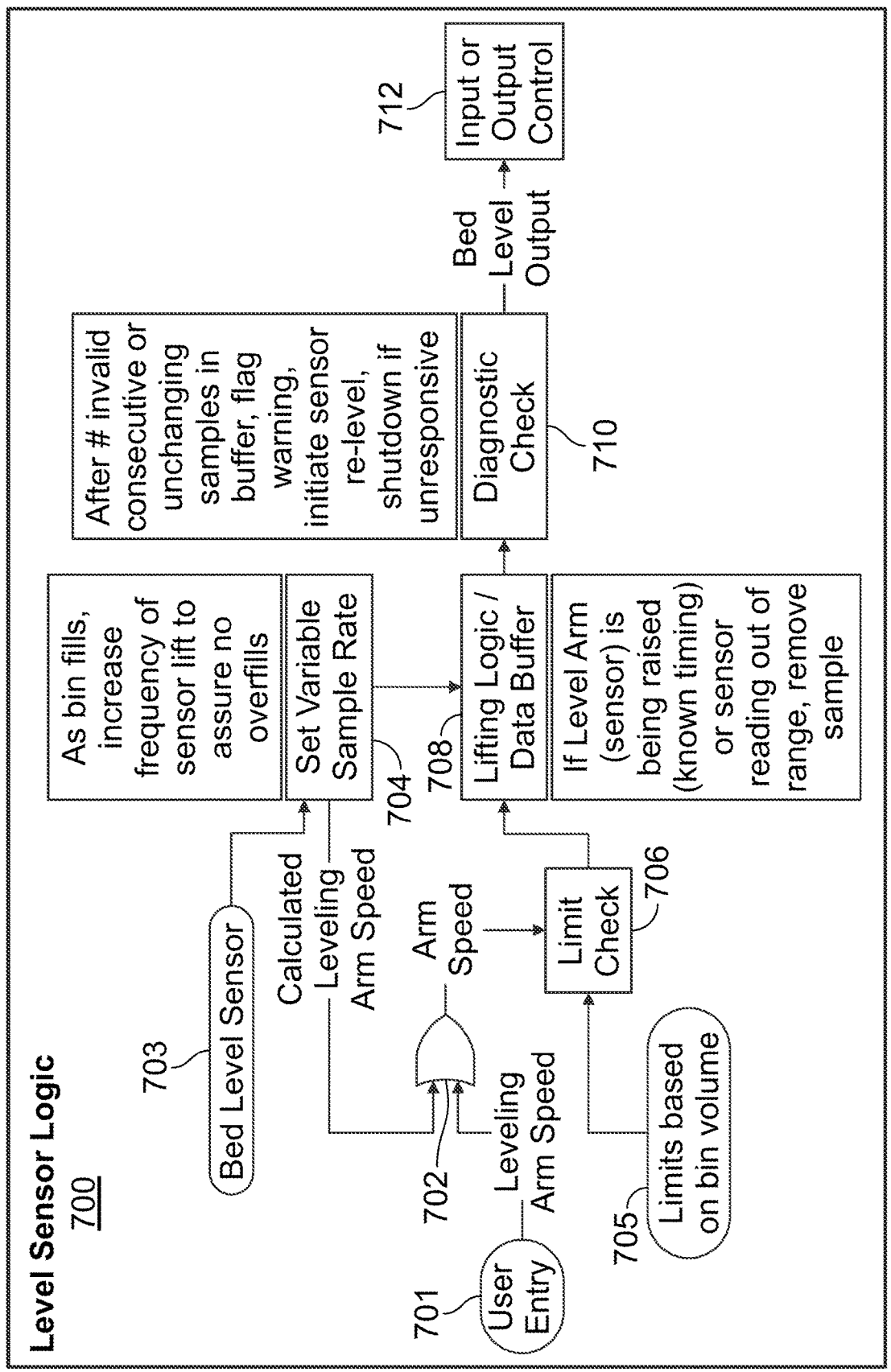
FIGS. 7-9 are flow diagram of an example method for operating a bed level sensor system, according to a particular embodiment.
Figure 8:
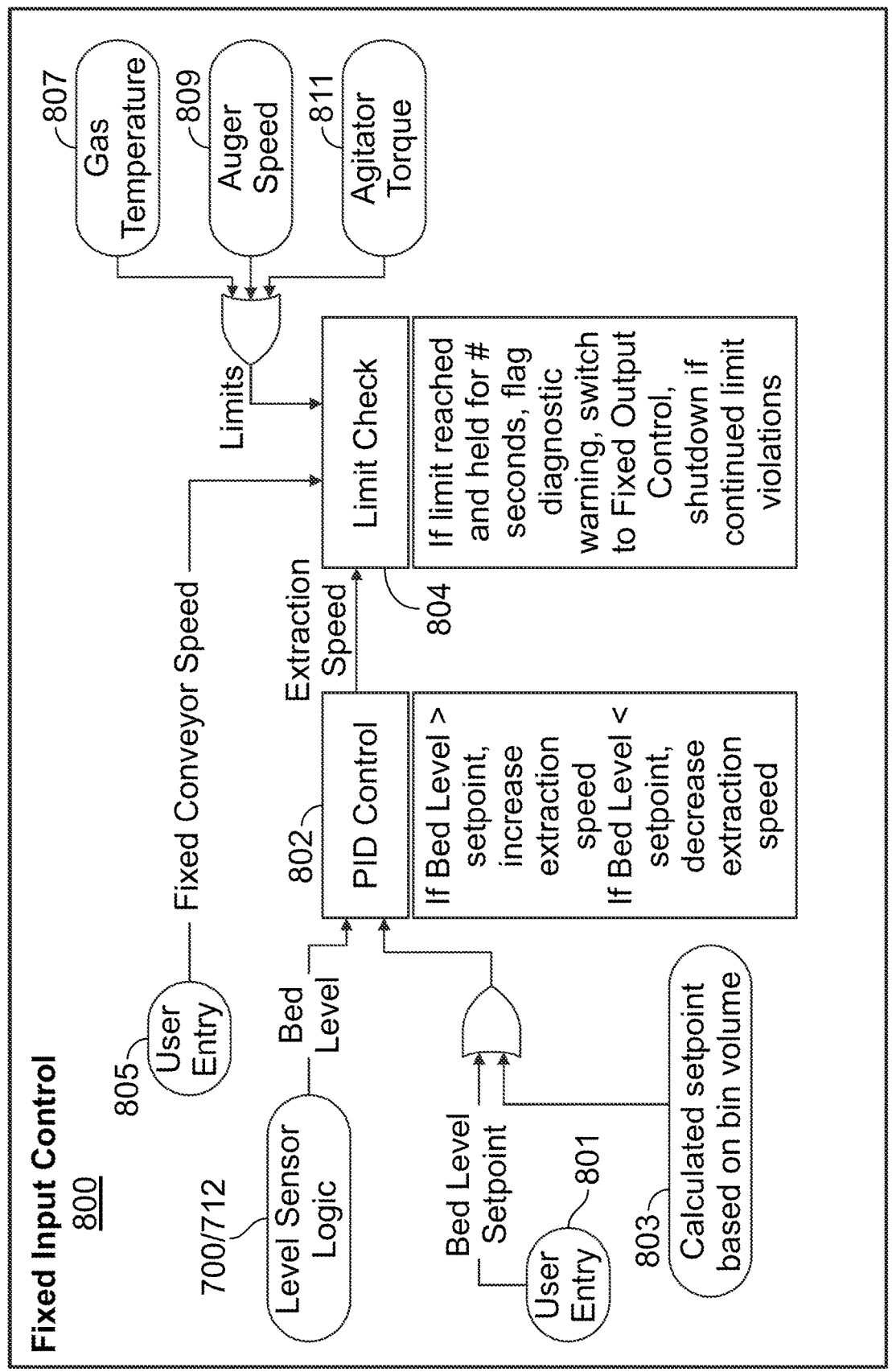
Figure 9:
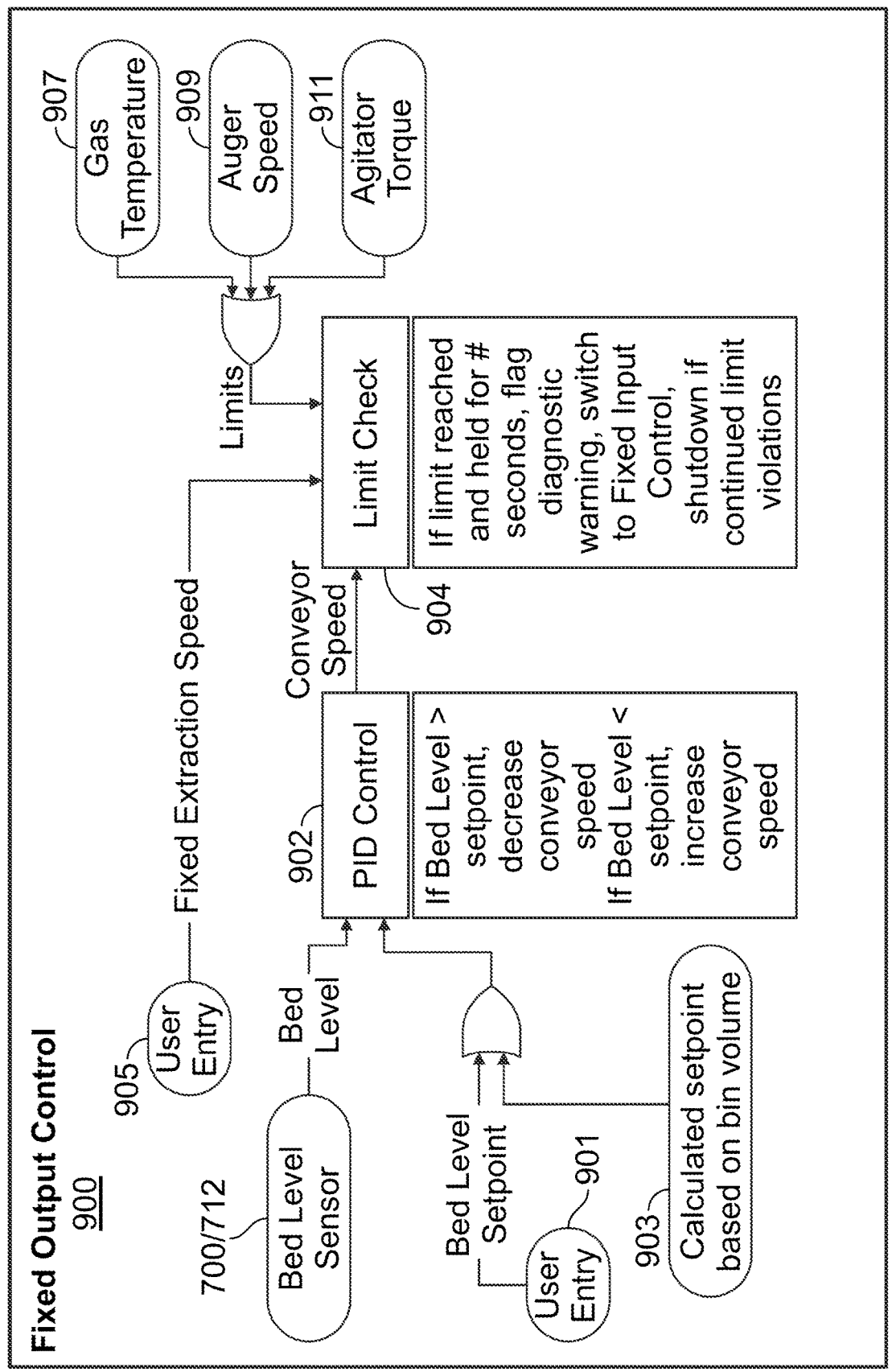

Referring now to FIGS. 7-9, flow diagrams illustrating a method for operating a bed level sensor system are shown according to a particular embodiment. FIG. 7 depicts a level sensor logic 700 for sensing and determining the solid bed level via a level sensor. Based on the bed level output from the level sensor logic, the level sensor logic feeds in the fixed input control logic of FIG. 8 or the fixed output control logic of FIG. 9 regarding how the gasifier feed is controlled.

Referring again to FIG. 7, example level sensor logic 700 is described in detail. At 702, a leveling arm speed is determined. The leveling arm speed may be determined based upon from the entry of a user entry/input (701). The user entry may be indicative of a leveling arm speed of the leveling arm. Alternatively, the leveling arm speed 702 may be determined based on a calculation indicative of the leveling arm speed. For instance, at 704, the level sensor measurement at 703 may be sampled at a variable rate. As a bin (e.g., reactor body) fills, the frequency of the sensor lift may be increased to assure no overfills. As such, the leveling arm speed is calculated and adjusted (e.g., increased). At 706, a limit check is performed based on the arm speed (e.g., the input/determination at 702) and the limits of the bin volume (e.g., input at 705). The limit check and the set variable sample rate are both used as inputs in populating a data buffer in the lifting logic at 708. Particularly, at 708, if the level sensor is being raised at a known timing or the level sensor is reading out of range, the sample is to be removed. For instance, the logic 700 is configured to ignore/omit a sample reading when the reading is determined to be invalid. An invalid reading may include a sensor reading indicative of a maximum threshold reached. For example, if a physical limiter for sensor height is not present and the sensor is only valid up to a height limit, data above that limit caused by lifting from the bed leveling arm would be omitted. At 710, a diagnostic check is performed. For instance, after a predetermined amount of invalid samples is detected (e.g., an accumulated amount or consecutive number of invalid sample readings reaches a predetermined threshold) at 708, a diagnostic event (such as a warning) is generated, a sensor relevel is initiated, and/or a shutdown occurs if it is unresponsive. Accordingly, the level sensor logic 700 provides an input to the fixed input or output control logic 800 and 900, respectively, as 712.

Referring now to FIG. 8, the fixed input control 800 is described in detail. The bed level output 712 (e.g. an operating parameter value) feeds into the proportional integral derivative control (PID Control) to maintain a particular bed level compared to a set point. For instance, at 802, the bed level output (e.g., at 712) of the level sensor logic 700 and one of a bed level set point based on a user entry at 801 or a calculated set point based on the bin volume at 803 factor into the PID control. If the bed level as detected by the level sensor is greater than or meets the set point, the logic 800 is configured to increase an extraction speed. If the bed level is less than the set point, the logic 800 is configured to decrease the extraction speed. At 804, a diagnostic/limit check is performed. For instance, a fixed conveyer speed (e.g., the conveyer feed into the gasifier) is set by a user entry at 805. As such, the fixed conveyer speed at 805, the determined extraction speed (e.g. a system input) at 802, and at least one of a gas temperature limit set at 807, an auger speed limit set at 809, and an agitator torque limit set at 811 are used to determine if a limit is reached. If the limit is reached and held for a predetermined period of time (e.g., a predetermined number of seconds), the logic 800 is configured to generate a diagnostic warning, switch to the fixed output control logic, and/or implement a shutdown if there are continued limit violations.

Referring now to FIG. 9, the fixed output control 900 is described in detail. The bed level output 712 (e.g. an operating parameter) feeds into the proportional integral derivative control (PID Control) to maintain a particular bed level compared to a set point. For instance, at 902, the bed level output (e.g., at 712) of the level sensor logic 700 and one of a bed level set point based on a user entry at 901 or a calculated set point based on the bin volume at 903 factor into the PID control. If the bed level as detected by the level sensor is greater than the set point, the logic 900 is configured to decrease a conveyer speed. If the bed level is less than the set point, the logic 900 is configured to increase the conveyer speed. At 904, a diagnostic/limit check is performed. For instance, a fixed extraction speed (e.g., the extraction of the biomass from the gasifier) is set by a user entry at 905. As such, the fixed extraction speed at 905, the determined conveyer speed (e.g. a system input) at 902, and at least one of a gas temperature limit set at 907, an auger speed limit set at 909, and an agitator torque limit set at 911 are used to determine if a limit is reached. If the limit is reached and held for a predetermined period of time (e.g., a predetermined number of seconds), the logic 900 is configured to generate a diagnostic warning, switch to the fixed input control logic, and/or implement a shutdown if there are continued limit violations.

As such, a system for reliably sensing bed level while providing variable control feedback is provided. The bed level sensor described herein allows for better bed level control for the biochar reactor with a low cost, durable, reliable method of bed level sensing.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A biochar production system comprising:
   a reactor body;
   a leveling arm configured to rotate and move along a leveling place in the reactor body;
   a bed level sensor system comprising:
      a float configured to move from a resting position on a biomass in the reactor to an ending position upon contact with the leveling arm arising from rotation of the leveling arm; and
      a level sensor coupled to the float via a connector, the level sensor configured to correspondingly move with the float; and
   a controller configured to:
      receive detected bed levels of the biomass within the reactor body from the level sensor, each detected bed level based upon a change between the resting position and the ending position;
      determine a plurality of sample readings based on the detected bed levels; and
      operate, based on the plurality of sample readings, the biochar production system.

2. The biochar production system of claim 1, wherein the controller is further configured to:
   omit invalid sample readings of the plurality of sample readings;
   determine an accumulated amount of invalid sample readings reaches a predetermined threshold; and
   generate a diagnostic event in response to the accumulated amount of invalid sample readings reaching the predetermined threshold.

3. The biochar production system of claim 1, wherein the controller is further configured to determine a variable sample rate based on the detected bed levels and set a leveling arm speed such that as the bed levels increase in the reactor, the leveling arm speed is compensated so as to adjust a lift frequency of the level sensor to prevent overfill.

4. The biochar production system of claim 3, wherein the controller is further configured to determine at least one of the leveling arm speed and a volume of the reactor.

5. The biochar production system of claim 1, wherein the controller is further configured to increase an extraction speed to direct biochar out of an outlet of the reactor body in response to a bed level being greater than a predetermined set point.

6. The biochar production system of claim 1, wherein the controller is further configured to decrease the extraction speed to direct biochar out of an outlet of the reactor body in response to a bed level being less than the predetermined set point.

7. The biochar production system of claim 1, wherein the controller is further configured to decrease a conveyer speed to direct biomass into the reactor body in response to a bed level being greater than a predetermined set point.

8. The biochar production system of claim 1, wherein the controller is further configured to increase the conveyer speed to direct biomass into the reactor body in response to a bed level being less than the predetermined set point.

9. The biochar production system of claim 1, further comprising a central rod disposed within the reactor body, and wherein the leveling arm extends from the central rod.

10. The biochar production system of claim 1, wherein the controller is configured to:
receive an output from the level sensor, the output from the level sensor used in detecting a particular a bed level in the reactor body;
determine a set point indicative of a desired bed level;
determine whether the output from the level sensor is greater than or equal to the set point;
responsive to determining the output is greater than or equal to the set point, activate at least one of (a) an extractor to direct more biochar out of the reactor body and (b) a conveyer to direct less biomass into the reactor body of the biochar production system to maintain a target operating parameter value;
responsive to determining the output is not greater than or equal to the set point, activate at least one of (a) the extractor to direct less biochar out of the reactor body and (b) the conveyer to direct more biomass into the reactor body of the biochar production system to maintain the target operating parameter.

11. The biochar production system of claim 10, wherein the controller is configured to determine the set point from a user entry of the desired bed level.

12. The biochar production system of claim 10, wherein the controller is configured to determine the set point from a calculated bed level based on a bin volume.

13. The biochar production system of claim 10, wherein the controller further comprises:
a fixed input control configured to:
direct biochar out of an outlet of the reactor body of the biochar production system at an extraction speed while maintaining a fixed conveyor speed,
responsive to determining the output is greater than or meets the set point, increase the extraction speed, and
responsive to determining the output is less than the set point, decrease the extraction speed; and
a fixed output control configured to:
direct biomass into the reactor body of the biochar production system at a a variable conveyer speed while maintaining a fixed extraction speed,
responsive to determining the output is greater than or meets the set point, decrease the variable conveyer speed, and
responsive to determining the output is less than the set point, increase the variable conveyer speed.

14. The biochar production system of claim 10, wherein the controller further comprises a limit check communicatively coupled to one or more operating sensors, the limit check configured to:
receive one or more operating characteristics of the biochar production system, the one or more operating characteristics detected by the one or more operating sensors, the one or more operating characteristics comprising at least one of a gas temperature, an auger speed, and an agitator torque;
responsive to an input limit being reached for a threshold period of time based on the one or more operating characteristics, the input limit determined by the limit check and corresponding to a limit on a fixed input control, generate an input diagnostic warning and perform one of (a) activate a fixed output control and (b) initiate a system shutdown;
responsive to an output limit being reached for the threshold period of time based on the one or more operating characteristics, the output limit determined by the limit check and corresponding to a limit on the fixed output control, generate an output limit diagnostic warning and perform one of (a) activate the fixed input control and (b) initiate a system shutdown.

* * * * *